Sept. 20, 1932.  H. W. INGLE  1,878,521

GLASSWARE FORMING APPARATUS AND METHOD

Filed March 31, 1928  6 Sheets-Sheet 1

Inventor:
Henry W. Ingle.

by Robson D Brown
Atty.

Witness.
O C Kaiser.

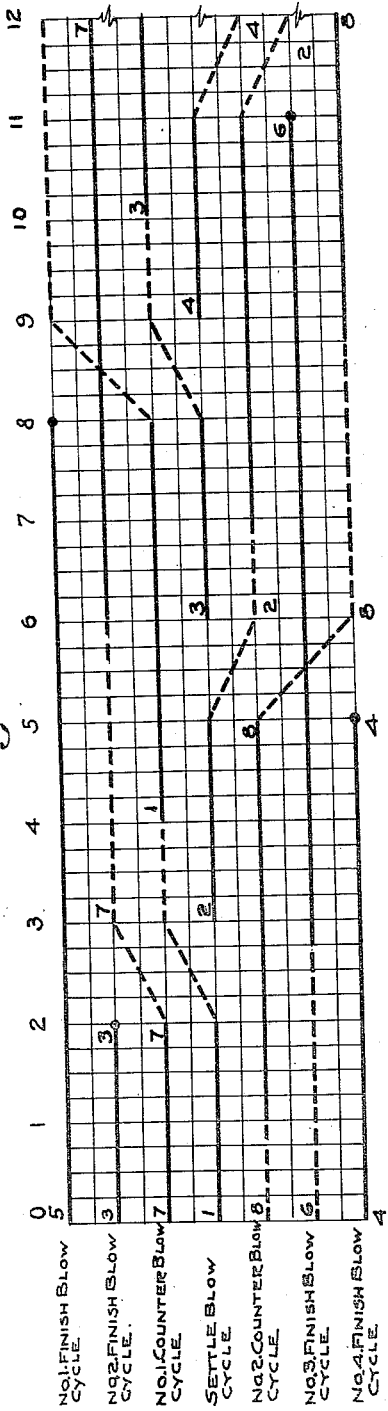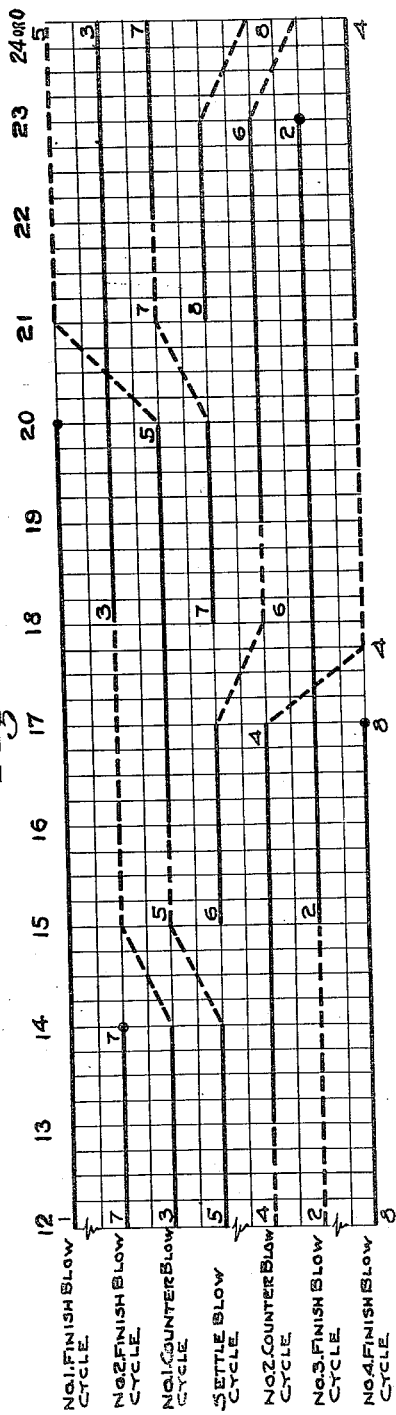

Sept. 20, 1932.   H. W. INGLE   1,878,521
GLASSWARE FORMING APPARATUS AND METHOD
Filed March 31, 1928   6 Sheets-Sheet 3

*Fig.26.*

Witness.
A C Kaiser

Inventor.
Henry. W. Ingle.
by Robson D Brown
Attorney.

Sept. 20, 1932. H. W. INGLE 1,878,521
GLASSWARE FORMING APPARATUS AND METHOD
Filed March 31, 1928 6 Sheets-Sheet 4

Inventor:
Henry W. Ingle.
by Robson D Brown
Attorney.

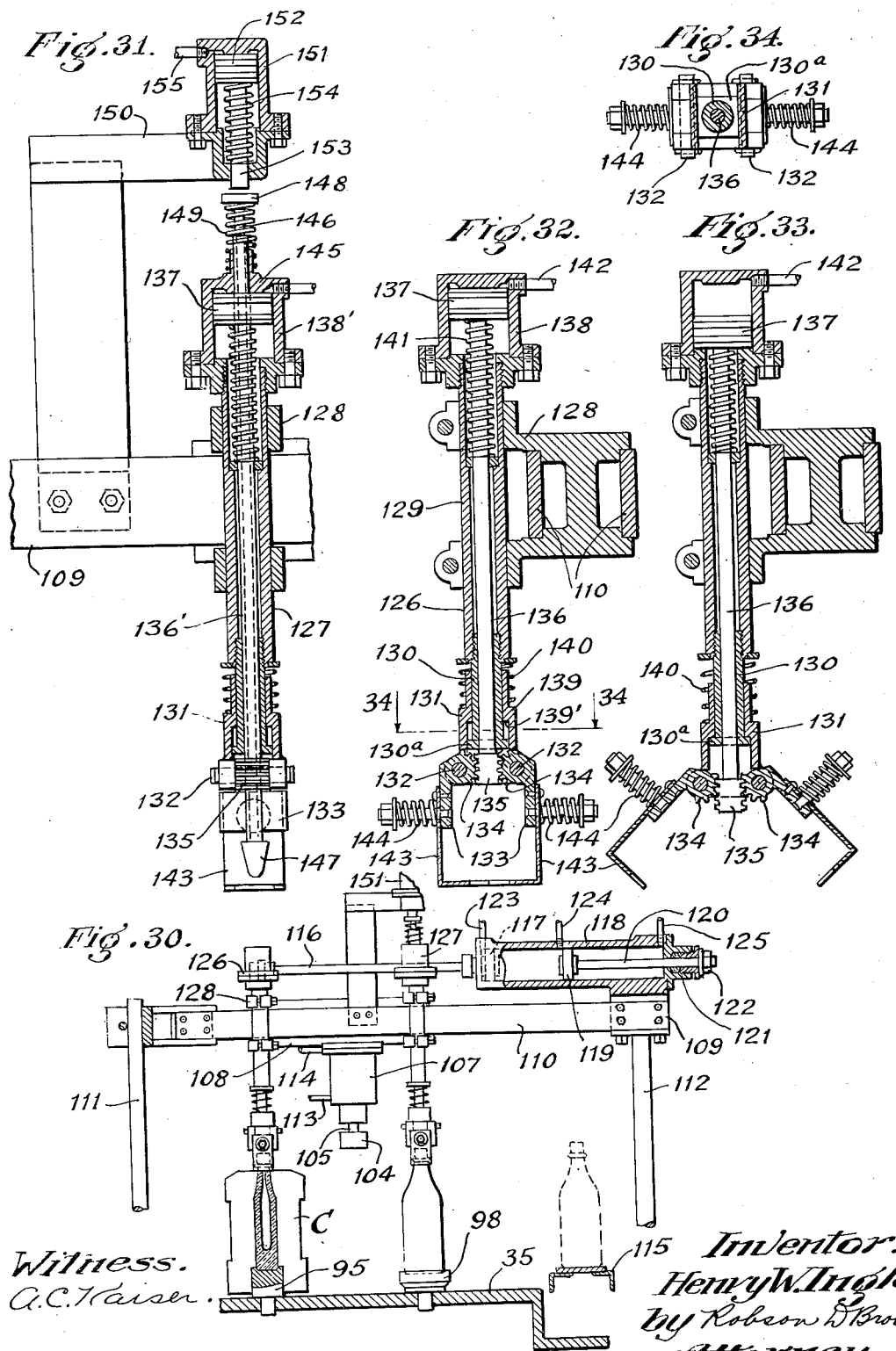

Patented Sept. 20, 1932

1,878,521

UNITED STATES PATENT OFFICE

HENRY W. INGLE, OF WEST HARTFORD, CONNECTICUT, ASSIGNOR TO HARTFORD-EMPIRE COMPANY, OF HARTFORD, CONNECTICUT, A CORPORATION OF DELAWARE

GLASSWARE FORMING APPARATUS AND METHOD

Application filed March 31, 1928. Serial No. 266,339.

This invention relates to apparatus for shaping hollow glassware, and it has particular relation to apparatus of the type embodying a blank or settle blow mold, into which the mold charges are initially introduced and in which the blank is partially shaped; a counter-blow mold, in which partially shaped blanks are counterblown; and a finish blow mold in which the counterblown blanks are blown to final form.

Heretofore, in apparatus of the type described, either the blank molds and counter-blow molds functioned alternately, with a consequent loss of time during which one or the other of the molds was idle, or the several molds functioned simultaneously, but for the same length of time, which resulted in imperfect ware, as it is a well established fact that the finish blowing time should exceed either the blank forming time or the counter-blowing time, and preferably the times of both of these operations.

One of the objects of the invention is to avoid the difficulties above mentioned by providing a method of shaping hollow glassware which both increases the rate of production of the machines and improves upon the quality of the ware produced thereby, and which, in its essentials, comprises compacting a mold charge in a blank mold to form the neck finish of the ware and to partially distribute and shape the glass of the body portion of the blank, reheating and transferring the blank thus formed to a counter-blow mold, counter-blowing the blank therein in order to form a blank suitable for the ware to be blown in the blow mold, compacting another mold charge in the blank mold, transferring the first mentioned blank to an associated blow mold, transferring the second mentioned blank to the counter-blow mold, counter-blowing the second mentioned blank therein, forming still another blank in said blank mold and blowing the first mentioned blank to final form in the blow mold substantially throughout the counter-blowing of the second mentioned blank in the counter-blow mold and the compacting of the third mentioned blank in the blank mold.

Another object of the invention is to avoid the difficulties above mentioned, by providing a machine for practicing the method described and in which the molds are in operation practically continuously, except for the time that they are performing some mechanical function, such as opening and closing, and in which the times that the molds are engaged in their fabricating operations may not only occur simultaneously in whole or in part, but may be increased or decreased with respect to each other in order to obtain a proper proportion of time for the blank forming, counter-blowing, and finish blowing operations, and to thereby both increase the output of the machine per mold per minute and the quality of the ware produced.

A further object of the invention is to provide a machine of the type described which embodies a blank mold, a plurality of counter-blow molds associated therewith and a plurality of finish blow molds associated with the counter-blow molds, and in which a blank is counterblown in one of the counter-blow molds during the fabrication of a succeeding blank or blanks for transfer to the same or another of the counter-blow molds and during the reheating of such blanks for other counterblow molds, and also in which a counterblown blank is blown to final form in one of the finish blow molds during the counter-blowing of a blank or blanks for transfer to the same or another of said finish blow molds and also during the reheating of counter-blown blanks for other finish blow molds, thus materially decreasing the time that the molds are idle and increasing the output of the machine.

The method of my invention and an apparatus suitable for carrying out the same are illustrated in the annexed drawings, of which:

Figures 1 to 24, inclusive, constitute a diagrammatic illustration of the steps of the method;

Figs. 25 and 25a, a time diagram further illustrating my method and particularly indicating the preferred cycle of operations of the machine as a whole;

Fig. 26 is a plan view of the apparatus;

Fig. 29 is a vertical section showing the construction of the blow heads associated with the settle blow mold and the counter-blow molds;

Fig. 30 is a vertical section showing particularly the combined transfer and take-out mechanism;

Figure 35:
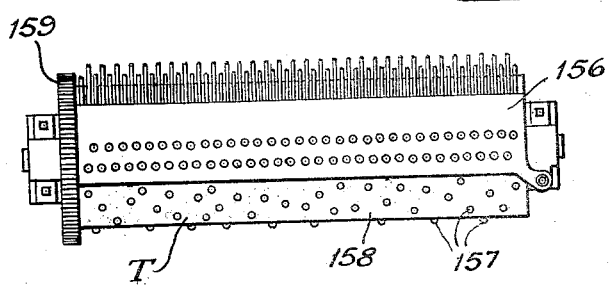

Figs. 31 to 34, inclusive, show details of this transfer and take-out mechanism; and Fig. 35 is a plan view of the timing mechanism.

In the drawings (particularly Figs. 26 to 35, inclusive) is shown a machine capable of carrying out the above stated method, which comprises a settle blow mold A into which a mold charge is initially introduced and in which the neck finish and the preliminary configuration is imparted to the body portion of the blank while in an inverted position; a pair of cooperating counter-blow molds B and C to which the blanks are alternately transferred from the blank mold A and in which they are counterblown in an upright position, and two pairs of finish blow molds D and E and F and G which are respectively associated with the counter-blow molds B and C and to which the counterblown blanks are alternately transferred from the counter-blow molds and blown to final form therein.

The molds A, B, C, D, E, F and G are all mounted in suitable relation upon a base 35 which also constitutes the top of a housing H for the mold opening and closing mechanism which is similar for all of the molds. Each mold comprises two mold halves or sections 36 and 37 which are carried respectively by mold holders 38 and 39. The mold holders are mounted on suitable pivots and provided with mechanism, whereby the molds may be opened and closed at suitable times to permit their cooperation in carrying out the steps of the method. The mold holders for each pair of mold sections are respectively provided with bearings 40 and 41, which bearings are fixed respectively to a shaft 42 and a sleeve 43 coaxial therewith. The sleeve 43 is suitably journaled in and supported by a bearing 44 formed on the base 35 and itself forms a journal for the shaft 42 which may also be journaled adjacent to its lower end in a bearing 44a on the bottom of the housing H. Oppositely extending crank arms 45 and 46 are respectively fixed to the shaft 42, and the sleeve 43 and the ends of these crank arms are connected by links 47 and 48 to crank arms 49 and 50 fixed respectively to vertical shafts 51 and 52 journaled in bearings 53, 53a formed in the top and bottom of the housing H. The shafts 51 and 52 carry gear wheels 54 and 55. A double tooth rack bar 56 extends horizontally between and in mesh with the said gear wheels. The rack bar is mounted at its outer end on piston rod 57 carried by a piston 58 mounted for reciprocation in a cylinder 59 carried by the base 35. The cylinder is provided at opposite sides of the piston with pipes 60 and 61 for the admission and exhaust of air through a suitable valve and timing mechanism, generally indicated at T (Fig. 27) and hereinafter described.

Associated with the counter-blow molds B and C are the sectional neck rings 62, 63, which neck rings alternately cooperate with the settle blow mold A and serve both to impart the neck finish to the ware and to transfer blanks from the settle blow mold A to the respective counter-blow molds B and C. These neck rings and their operating mechanism are similar in construction and operation to those shown and described in my copending application, Serial No. 743,531, filed October 14, 1924, and inasmuch as they are identical in construction, only one will be described.

The neck ring 63 (see Fig. 26) is composed of two sections or halves mounted respectively on arms 64 and 64'. These arms are so formed, mounted and operated as to open and close the sections and to swing them about a horizontal axis from a position below the settle blow mold A to a position above the counter-blow mold C. The arms 64 and 64' are respectively mounted for vertical adjustment on guides 65 and 65' formed on the outer shells of a pair of opposed cylinders 66—66' having hub portions 66a and 66b, respectively, mounted for endwise sliding movement upon a rock shaft 68. The rock shaft is provided mid way of its ends and between the hubs 66a and 66b of the cylinders 66—66' with a sleeve 67 which is provided with horizontal end to end passages 67'. The sleeve 67 is fixed to the rock shaft and acts as a stationary piston to which the cylinders 66—66' are splined for sliding movement toward and away from each other. The rock shaft 68 is mounted in suitable bearings formed in brackets 69 mounted on the base 35. At its outer ends the shaft is provided with thimbles 70' within which are mounted coil springs 70 abutting the hubs 66a—66b on the cylinders 66—66' and over which slide projecting ends of the cylinders 66—66'. The shaft 68 contains a longitudinal air passage through which compressed air is periodically admitted to the cylinders 66—66' through a port 200 and the passages 67' to force the same outwardly on the sleeve 67 against the pressure of the springs 70 and thereby to open the neck ring. The application of this air may be controlled in any suitable manner, as through a tube 71 from the timing mechanism T (Fig. 27), or by a suitable arrangement of vents in the neck ring mechanism itself, whereby the oscillatory movement of the neck ring applies and exhausts air from the cylinders.

The neck ring is oscillated to and from its operative positions with the settle blow mold A and counter-blow mold C by a segmental gear 72, fixed to the sleeve 67, by the operation of a reciprocating rack bar 73. The rack bar is formed on the upper portion of a piston rod 74 which is carried by a piston 75 mounted for reciprocation in a cylinder 76 carried by the base 35 (see Fig. 27).

The cylinder 76 is provided on either side of the piston with a pipe 77—77' for the application and exhaust of compressed air. The application and exhaust of this pressure may be controlled by the valve and timer mechanism T to cause a reciprocation of the piston and the consequent movement of the neck ring at the desired times.

A neck plunger 78 cooperates with the neck rings 62 and 63 during the fabrication of a blank in the settle blow mold A and is carried by a piston 79 which reciprocates within a vertical cylinder 80 carried by a bracket 81 located beneath the base 35. Fluid pressure is admitted to and exhausted from the cylinder 80 in order to raise and lower the plunger 78 into and out of cooperative position with the neck rings through pipes 81' and 82.

The blank mold A is preferably provided with a funnel portion 83 adjacent to the upper end of the mold cavity to facilitate the introduction of mold charges thereto.

A settle blowhead 84 (see Figs. 27 and 29) also cooperates with the mold A to compact the mold charges therein and in the neck rings 62 or 63. This head is carried at one end of a hollow arm 85 which is fixed at its other end to a vertical piston rod 86. This rod extends through a cylinder 87 and a slide bearing 88 fixed to the under side of the base 35 and carries a piston 89. A spring 90 surrounds the rod 86 below the piston and tends to elevate the blowhead. Fluid pressure is admitted to and exhausted from the cylinder 87 above the piston to lower the blowhead into operative engagement with the blank mold through a pipe 91. The blowhead is swung between a position over the mold and a position at one side thereof simultaneously with its downward and upward movements, by a pin 92, which is carried by the rod 86 and which slidably engages a spiral slot 93 provided in the bearing 88. Air pressure is delivered to the hollow arm and blowhead 84 in any suitable manner.

The counter-blow molds B and C are each provided with a bottom plate 95 and respectively are provided with counter-blowheads 96 and 97, the construction and operation of which are similar to the settle blowhead 84 just described.

The finish blow molds D, E, F and G are each provided with a bottom plate 98 and respectively are provided with finish blowhead mechanisms 101, 102, 103 and 104, Fig. 26, all of similar construction. As indicated by the showing of the blowhead mechanism 104 in Fig. 27, each finish blowhead is carried by a piston rod 105 which also carries a piston 106 which is mounted for reciprocation in a cylinder 107. This cylinder is suspended from a carriage 108 which is slidably mounted for horizontal reciprocation on an overhead track 109. Air under pressure for application to the final blow mold when the final blowhead is in blowing relation thereto may be supplied to the blowhead in any suitable manner, as through the pipe 104a, Fig. 27, during a period which may be determined by the timer and valve mechanism T. The track 109 comprises parallel rails 110 which are supported at their ends by vertical posts 111 and 112 carried by the base 35. The blowhead is raised and lowered by air pressure which is admitted to and exhausted from the cylinder 107 below and above the piston 106 through pipes 113 and 114.

Means are provided associated with each final blow mold and its counter-blow mold for simultaneously transferring a counterblown blank from the counter-blow mold to the final blow mold and for taking out the finished bottle from the final blow mold. As all of the transfer and take-out mechanisms above referred to as associated with the several final blow molds are the same, only one will be described and such mechanism will not be specifically claimed in this application, as it constitutes the invention of another and is claimed in the copending application of Algy J. Smith, Serial No. 266,320, filed March 31, 1928.

Figure 27:
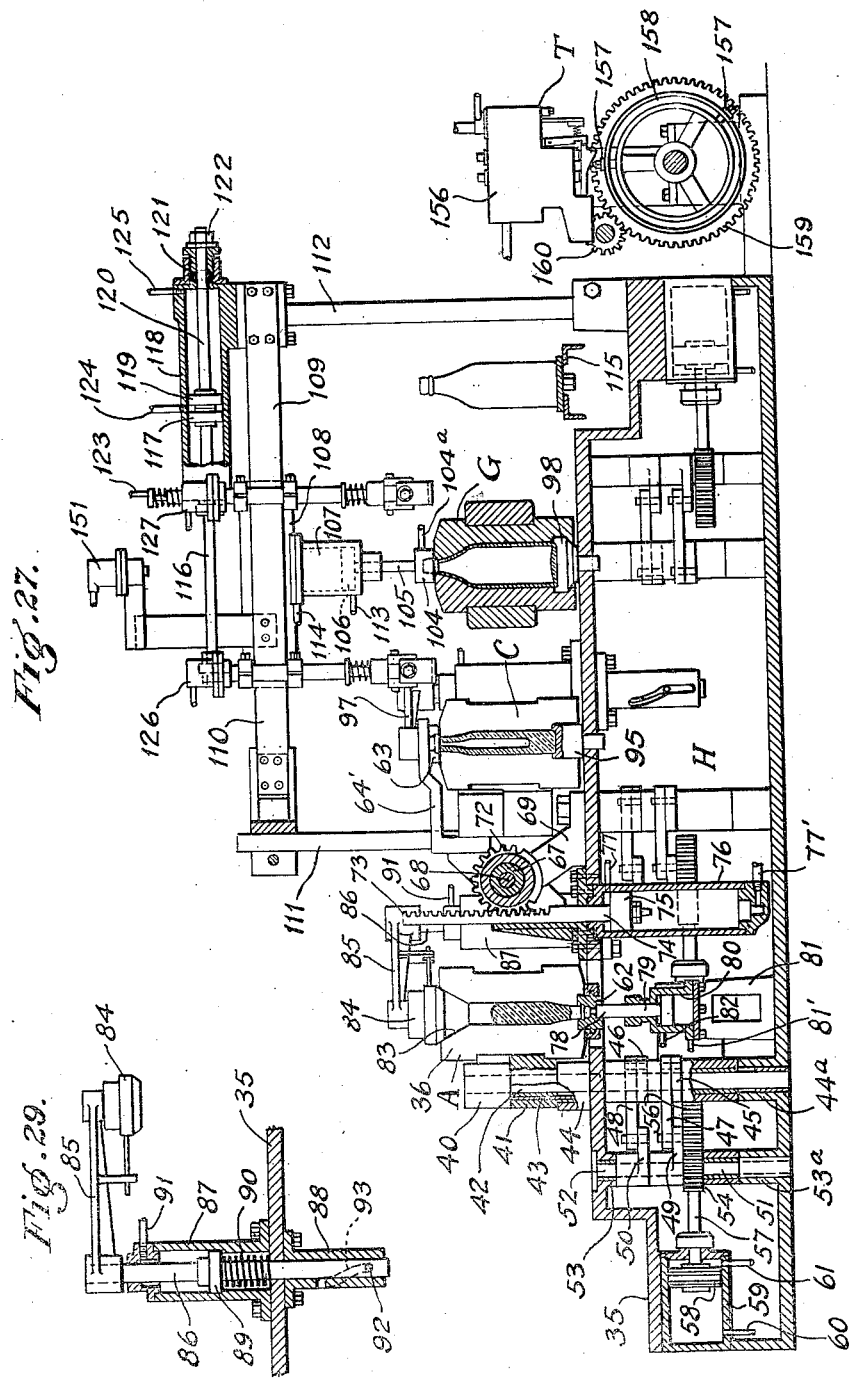
Fig. 27 is a vertical section of the apparatus taken on the line X—X of Fig. 26.
Figure 28:
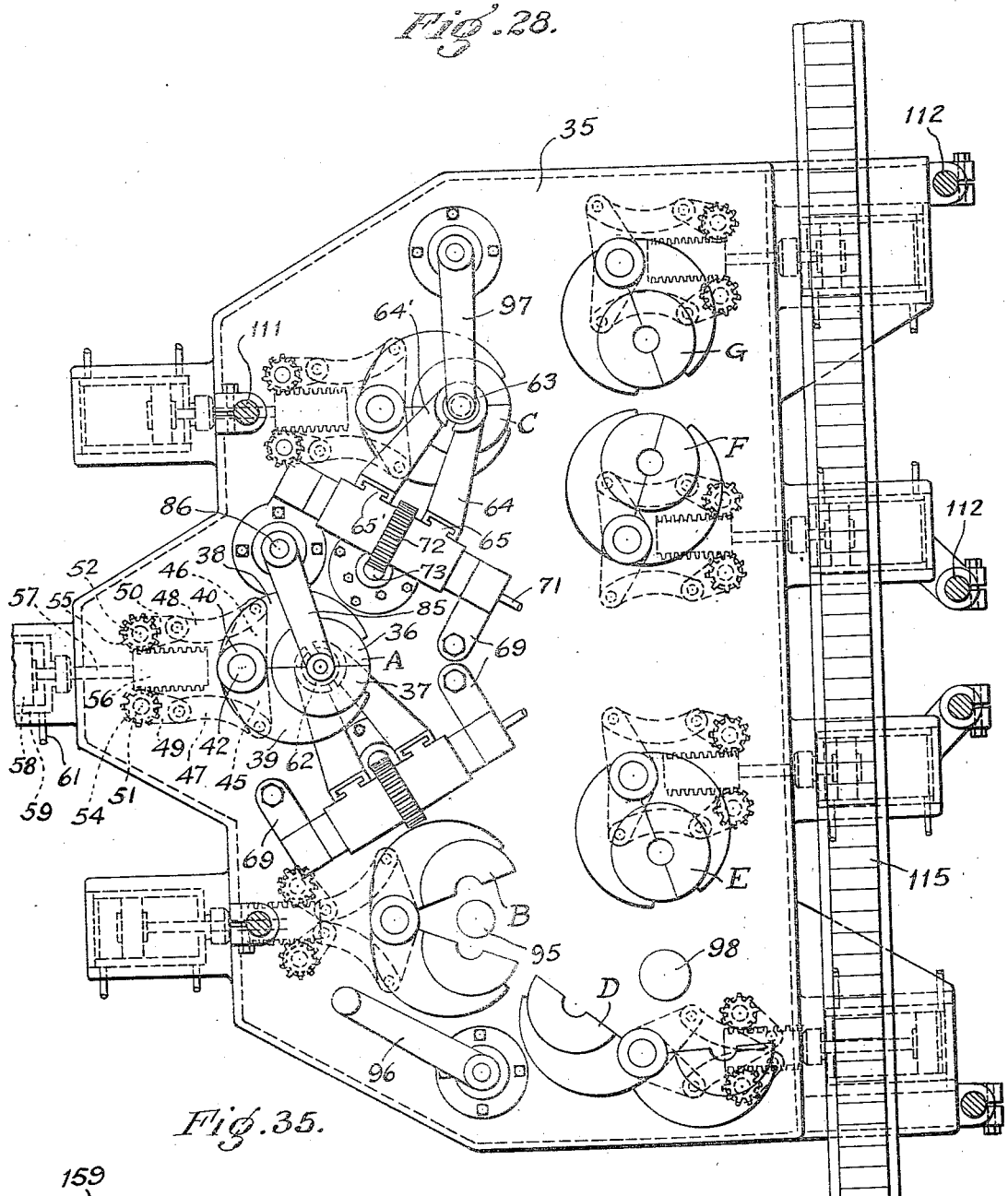
Fig. 28 is a plan view of the mechanism, omitting the means for transferring the blank from the counter-blow molds to the final blow molds and illustrating particularly the means for opening and closing the several molds.

A track 109 is supported as by posts 111—112 above each final blow mold (as G) and its associated counter-blow mold C, Fig. 27. A carriage 108, heretofore described, is mounted for reciprocation on the track, being propelled through suitable connections by piston rod 116 of a piston 117 mounted for reciprocation in a cylinder 118 mounted at the outer end of the track. A second piston 119 is mounted in the cylinder 118 and is provided with a piston rod 120 extending outwardly through the cylinder and through a suitable stuffing box 121. The piston rod 120 terminates in an adjustable head or nut 122 adapted to regulably limit the throw of the piston 119 toward the piston 117. The cylinder 118 is provided with three pipes, 123, 124, 125, for the controlled admission and exhaust of compressed air to and from the cylinder. As shown (Fig. 27), the pipe 124 enters the cylinder 118 at a point to the left of the piston 119 when that piston is at the end of its throw to the left, while the pipes 123 and 125 respectively enter the cylinder 118 at the left and right hand ends thereof.

It is apparent that with this arrangement and by the suitable control of the admission and exhaust of air through the several pipes that the carriage and the parts carried thereby may be positively and accurately moved to and positioned at three different positions. Mounted on the carriage 108, in addition to the final blowhead and on either side thereof, are the transfer and take-out tong mechanisms 126 and 127, the mechanism 126 being provided to effect the transfer of the counterblown blank to the final blow mold and the mechanism 127 being supplied to take out the finished bottle and deposit it on the buck 115. The mechanisms 126 and 127 are in general similar, save that the mechanism 127 is provided with a means for steadying the bottle while being grasped by the take-out tongs, which mechanism is not shown in the mechanism 126. The transfer mechanism 126 comprises (see Figs. 31, 32, 33 and 34) a suitable bracket 128 attached to the carriage 108 in which is mounted a barrel 129. Into the lower end of the barrel 129 is screwed a sleeve 130 having smaller exterior dimensions than the barrel, and over this sleeve is mounted a second sleeve 131 provided at its lower end with suitable studs or shafts 132, upon which are pivoted tong finger supporting members 133. Each of these supporting members is provided with a gear sector 134 adapted to mesh with a double tooth rack 135 formed at the lower end of a piston rod 136 which passes upwardly through the sleeve 130 and the barrel 129 and is attached to a piston 137 adapted to reciprocate in a cylinder 138 suitably mounted at the upper end of the barrel 129. The second sleeve or head 131 is provided with upper and lower shoulders 139 and 139', respectively. A compression coil spring 140 is provided between the shoulder 139 and the lower end of the barrel 129 and tends to force the sleeve 131 and the tong supporting members downwardly from the position shown in Fig. 32 to the position shown in Fig. 33. A flange 130a on the lower end of the sleeve 130 serves as a stop for engaging with the shoulder 139' to prevent downward movement of the sleeve 131 from the position shown in Fig. 33. When the piston moves away from its upper position, it compresses a coil spring 141 arranged within the barrel 129 and beneath the piston 137. The spring 141 returns the piston to its upper position when air is exhausted from above the piston. A pipe 142 enters the cylinder above the piston to supply and exhaust compressed air under the control of suitable valve and timing devices, such as that shown at T. Tong fingers 143 are mounted on the supports 133 and are preferably attached thereto by a spring attachment 144 to permit a limited and regulable resilient gripping action as the fingers close to grasp the article.

The take-out mechanism 127 is similar in structure and operation to the mechanism 126 except that the piston rod 136' of the transfer mechanism is hollow and extends through the piston and through a suitable stuffing box 145 in the top of the cylinder 138'. Through this hollow piston rod 136' extends a rod 146 terminating in a suitable head 147 adapted to enter the neck of the bottle and to steady it when the halves of the final blow mold are removed. The upper end of this rod is provided with a head 148 beneath which is a coil spring 149 abutting against the top of the cylinder 138' which tends to hold the steadying head in upper or retracted position. Mounted on the track 109 is a bracket 150 carrying a cylinder 151 in which is mounted a piston 152 having a rod 153, the end of which is adapted to be moved downwardly into contact with the head 148 to project the steadying head 147 into the neck of the bottle. A coil spring 154 beneath the piston head normally maintains the piston 152 in its upper position from which it is moved by compressed air supplied through a pipe 155 at suitable times.

The operation of the transfer and take-out is as follows—Starting in the position shown in Fig. 27 wherein the final blow head is shown in final blowing position, the tongs of the mechanisms 126 and 127 are open, as shown in Fig. 33, and the steadying head 147 is retracted. When the final blow is completed, air is supplied through the pipe 113 and exhausted through the pipe 114 to raise the blowhead 104, whereupon pressure is admitted through the pipe 124 to the cylinder 118 and exhausted through the pipe 123. This causes the carriage to move to the left, positioning the mechanism 126 over the counter-blow mold and the mechanism 127 over the final blow mold. Compressed air is then applied to the cylinder 151, forcing the piston rod 153 against the head 148, and forcing the steadying head 147 into the neck of the bottle in the final blow mold. Air is exhausted from the cylinders 138 and 138', whereupon the pistons in that mechanism rise, closing the tongs about the neck portions respectively of the counterblown blank and the finished bottle. This closing movement is followed by an upward movement of the closed tongs, and as the molds have opened, the counterblown blank and the final bottle are lifted from the bottom plates. Air is then exhausted from the cylinder 118 through pipes 124 and 125 and supplied through the pipe 123 which causes a throw of both pistons 117 and 119 to their extreme right hand position, positioning the final bottle over the buck 115 and the counterblown blank above the bottom plate 98 of the final blow mold. Air is then applied through the pipes 142 and the cylinders 138 and 138′ which cause first a downward movement of the tong heads and then opens the tongs, depositing the completed bottle upon the buck 115 and the counterblown blank in the final blow mold. Air is then exhausted from the cylinder 118 through the pipe 123 and applied through the pipe 125, throwing the carriage 108 to the position shown in Fig. 27. Meanwhile, the molds close, whereupon air is applied through pipe 114 to cylinder 107 and exhausted through the pipe 113 and the finish blowhead is moved into cooperative relation with the final blow mold.

The operation of the different mechanisms, as, for example, the movement of the various pistons and the application and discontinuance of blowing pressure to form the blanks and final bottles, may be controlled by any suitable valve and timer mechanism, as, for instance, that diagrammatically illustrated in Figs. 27 and 35 and specifically illustrated and described in detail in my copending application, Ser. No. 735,079, filed Aug. 30, 1924. Basically, this valve and timer mechanism comprises a bank of suitable plunger valves arranged to be opened and closed to effect the desired control by the rotary movement of a stack of adjustable cams. In general, the cams comprise lugs mounted on a rotating drum and adjustable therearound, and in those instances in which it is desired to have separate control of exhaust and admission of air, a pair of differently proportioned cams are arranged to travel in the same path, one of which is arranged to close and lock the valve in one position and the other of which is arranged to unlock and release the valve, permitting it to move under spring pressure to its initial position. In general, the valves are such that, when moved in one direction, air is admitted to a particular mechanism, and exhaust from that portion of the mechanism is at the same time cut off, while on the reverse movement of the valve the application of air is cut off while the exhaust is opened. The bank of valves of such mechanism is diagrammatically illustrated in Fig. 27 at 156. The drum carrying the adjustable cams 157 is illustrated at 158. The drum may be driven by any suitable means, as by the gearing 159, from any suitable source indicated by the gearing 160.

According to my method, a mold charge is delivered to the blank mold A and is settle-blown therein to form a blank 1 (Figs. 1 and 2). The blank thus formed is then transferred to the counter-blow mold B (Fig. 3) during which time it is allowed to reheat, that is to say, the internal heat of the glass is permitted to soften the chilled outer skin of the blank caused by contact with the walls of the blank mold, and this reheating continues during the time required for the counter-blow mold to close about the blank 1 and counter-blowing pressure to be applied.

At this stage in the cycle of operation of the machine, a second mold charge is delivered to the blank mold A and is settle-blown to form a blank 2 (Fig. 4). Counterblowing pressure is then applied to the blank 1 in the counter-blow mold B, settle-blowing pressure being still maintained in the mold A (Fig. 5). The blank mold A then opens and the blank 2 is transferred to the counter-blow mold C and reheats while the mold is closing and while it awaits the application of counterblowing pressure. During this time counterblowing pressure is still being applied to the blank 1 in the counter-blow mold B (Fig. 6).

At this stage in the operation of the machine, a third mold charge is delivered to the blank mold A and is settle-blown to form a blank 3, during which time the blank 2 is still reheating in the counter-blow mold C and counterblowing pressure is still being applied to the blank 1 in the counter-blow mold B (Fig. 7). Counterblowing pressure is then applied to the blank 2 in the counter-blow mold C, settle-blowing pressure being still maintained in the mold A, and counterblowing pressure being still applied to the blank 1 in the counter-blow mold B (Fig. 8). The blank mold A, the counter-blow mold B and the finish blow mold D are then opened and the counterblown blank 1 is transferred to the finish blow mold D, and the settle-blown blank 3 is substantially simultaneously transferred to the counter-blow mold B, during which time counterblowing pressure is still being maintained in the blank 2 (Fig. 9).

At this stage in the cycle of operation of the machine, a fourth mold charge is delivered to the blank mold A and is settle-blown to form a blank 4, the blanks 1 and 3 are reheating in the finish blow mold D and the counter-blow mold B respectively during the closing of these molds and before the application of finish blowing and counterblowing pressures, and counterblowing pressure is still being applied to the blank 2 in the counter-blow mold C (Fig. 10).

Counterblowing pressure is then applied to the blank 3 in the counter-blow mold B, settle blowing being still maintained in the blank mold A, counterblowing pressure still being applied to the blank 2 in the counter-blow mold C and the blank 1 being still permitted to reheat in the finish blow mold D (Fig. 11). The blank mold A, the counter-blow mold C and the finish blow mold F are then all opened and the counterblown blank 2 is transferred to the finish blow mold F and the settle-blown blank 4 is substantially simultaneously transferred to the counter-blow mold C, during which time the blank 3 is still being counterblown and the blank 1 is still being allowed to reheat in the finish blow mold D (Fig. 12).

At this stage in the cycle of operation of the machine, a fifth mold charge is delivered to the blank mold A and is settle-blown therein to form a blank 5, finish blowing pressure is applied to the blank 1 in the blow mold D, counterblowing pressure is still being maintained in the blank 3 and the blanks 2 and 4 are reheating in the blow mold F and the counter-blow mold C respectively (Fig. 13). Counterblowing pressure is then applied to the blank 4 in the counter-blow mold C, settle-blowing pressure being still maintained in the mold A, counterblowing pressure being still maintained in the blank 3, finish blowing pressure being still applied to the blank 1 in the finish blow mold D and the blank 2 being still permitted to reheat in the finish blow mold F (Fig. 14). The blank mold A, the counter-blow mold B and the finish blow mold E are then all opened and the counterblown blank 3 is transferred to the finish blow mold E and the settle-blown blank 5 is substantially simultaneously transferred to the counter-blow mold B, during which time the blank 4 is still being counterblown in the mold C, the blank 1 is still being finish blown in the mold D and the blank 2 is still being permitted to reheat in the blow mold F (Fig. 15).

At this stage in the cycle of operation of the machine, a sixth mold charge is delivered to the blank mold A and is settle-blown therein to form a blank 6, finish blowing pressure is applied to the blank 2 in the blow mold F, counterblowing pressure is still being maintained in the blank 4, the blanks 3 and 5 reheating in the blow mold E and the counter-blow mold B, and finish blowing pressure is still being applied to the blank 1 in the blow mold D (Fig. 16).

Counterblowing pressure is then applied to the blank 5 in the counter-blow mold B, settle-blowing pressure being still maintained in the blank mold A, counter-blowing pressure being still maintained in the blank 4, finish blowing pressure being still applied to the blank 1 in the finish blow mold D and to the blank 2 in the blow mold F, and the blank 3 still being permitted to reheat in the blow mold E (Fig. 17). The blank mold A, the counter-blow mold C and the finish blow mold G are then all opened and the counterblown blank 4 is transferred to the finish blow mold G and the settle-blown blank 6 is substantially simultaneously transferred to the counter-blow mold C, during which time the blank 5 is still being counterblown in the counter-blow mold B, the blanks 1 and 2 being still finish blown in the blow molds D and F respectively and the blank 3 being still permitted to reheat in the blow mold E (Fig. 18).

At this stage in the cycle of operation of the machine, a seventh mold charge is delivered to the blank mold A and is settle-blown therein to form a blank 7, finish blowing pressure is applied to the blank 3 in the blow mold E, counterblowing pressure still being maintained in the blank 5, finish blowing pressure still being maintained in the blanks 1 and 2 in the blow molds D and F respectively, and the blanks 4 and 6 still being permitted to reheat in the blow mold G and the counter-blow mold C respectively (Fig. 19). Counterblowing pressure is then applied to the blank 6 in the counter-blow mold C, settle-blowing pressure being still maintained in the blank mold A, counterblowing pressure still being maintained in the blank 5, finish blowing pressure still being applied to the blank 1 in the blow mold D, the blank 2 in the blow mold F and the blank 3 in the blow mold E, and the blank 4 still being permitted to reheat in the blow mold G (Fig. 20). The blank mold A, the counter-blow mold B and the finish blow mold D then all open, and the blank 1, which has by this time been blown to final form and become sufficiently set to permit handling without deformation, is removed from the blow mold D and transferred to a buck or conveyor to be transported to an annealing lehr, and a bottle fabricating cycle is completed. Simultaneously, however, with the removal of the ware from the blow mold D, the counterblown blank 5 is transferred from the counter-blow mold B to the blow mold D, and the blank 7 is transferred from the blank mold A to the counter-blow mold B. Throughout these mechanical motions, counterblowing pressure is still being applied to the blank 6 in the counter-blow mold C, finish blowing pressure is maintained in the blanks 2 and 3 in the blow molds F and E respectively, and the blank 4 is still reheating in the blow mold G (Fig. 21).

At this stage in the cycle of operation of the machine, an eighth mold charge is delivered to the blank mold A and is settle-blown to form a blank 8, finish blowing pressure is applied to the blank 4 in the blow mold G, couterblowing presure is still being maintained in the blank 6, finish blowing pressure is still being maintained in the blanks 2 and 3 in the blow molds F and E respectively, and the blanks 5 and 7 are still being permitted to reheat in the blow mold D and the counter-blow mold B respectively (Fig. 22). Counterblowing pressure is then applied to the blank 7 in the counter-blow mold B, settle-blowing pressure being still maintained in the blank mold A, counterblowing pressure still being maintained in the blank 6, finish blowing pressure still being applied to the blank 2 in the blow mold F, the blank 3 in the blow mold E and the blank 4 in the blow mold G, and the blank 5 still being permitted to reheat in the blow mold D (Fig. 23). The blank mold A, the counter-blow mold C and the finish blow mold F then all open, and the blank 2, which has by this time been blown to final form, is removed from the blow mold F. Simultaneously with the removal of the ware from the blow mold F, the blank 6 is transferred thereto from the counterblow mold C, and the blank 8 is transferred to the counterblow mold C from the blank mold A. Throughout these mechanical motions, blowing pressure is still being applied to the blank 7 in the counter-blow mold B, finish blowing pressure is maintained in the blanks 3 and 4 in the blow molds E and G respectively, and the blank 5 is still reheating in the finish blow mold D (Fig. 24), and the above described operations are repeated.

It will be obvious that counterblowing pressure is not applied continuously from the time it commences until the time it finally ceases, but that during the counterblowing time the counterblow head lifts for a short distance to allow the removal of the neck ring, and that thereafter it settles down over the neck of the bottle and finishes the operation. The period of cessation of counterblowing is so short that it is negligible, as it is not of sufficient duration to allow the parison to contract out of contact with the walls of the counterblow mold.

In the three mold art, the term "feed" mold is used interchangeably with blank mold, "form" mold with "counterblow" mold, and "blow" mold with "final blow" mold, and throughout this specification and claims such terms are respectively used interchangeably.

From an inspection of Figs. 1 to 25 and 25a, it appears that it requires twenty units of time to complete the cycle of the machine, during which time a particular charge of glass has passed through its three molds, and has been fully treated therein. The cycle begins at the time a charge of glass is introduced to the blank mold and ends at the time of cessation of final blowing. It is also apparent that the arrangement shown, and the method described, provides for the delivery of a completed bottle at the end of every three of these twenty units during the continuous operation of the machine. Thus it will be seen that my method and the apparatus herein described permit each charge of glass to be treated properly throughout the necessary large number of units while at the same time providing a high production, accomplished primarily by the overlapping functioning of the various molds and their associated mechanism. The substantially continuous use of each of the molds assures the maintenance of proper heat conditions in the mold and hence a high quality of ware. It is noted that each mold is open and cooling not longer than one of the twenty time units referred to above. It will be understood that the term "blank", as used in connection with the removal of a blown bottle from the blow molds, is employed to avoid confusion, inasmuch as during the latter stages of the application of finish blowing pressure, the blank has lost its identity as such and has assumed that of a finished bottle. Furthermore, it will be noted that the reheating periods, mentioned in connection with fabrication of the ware and indicated by the dotted lines in Figs. 25 and 25a, commences with the opening of the mold from which it is removed, during the transfer of the ware to the next succeeding mold, during the time that this mold is being closed and until the application of blowing pressure blows the glass into intimate contact with the walls of the mold. This reheating period, therefore, overlaps, either wholly or in part, the actual transferring operation of another article of ware and also the blowing operations occurring in certain of the associated molds. It will also be noted that, assuming that the units of time are one second each, it will require twenty seconds to fabricate a bottle, thereby providing ample time for the several blowing and reheating operations, and at the same time increasing the production of the machine as an entirety.

It is obvious that the mechanism shown may be used in a vast variety of ways, still generally within the spirit of my invention, and that various methods, all generally contemplated by me, may be used to secure a variety of desirable results. For example, the units of time for particular operations above described may be varied, particularly when such variance tends, because of the peculiar characteristics of the glass to be operated upon, to improve the quality of the ware produced, or increases the speed of production of the ware. The speed of the machine, of course, may be varied so that the units may be made longer or shorter, dependent primarily upon the size, weight and character of the ware to be produced, one of the limitations for any particular type of ware being the length of the period necessary to form the final article in the final blow mold. It is well known that this period varies with different kinds of ware, and it is true also that the most suitable period for other operations varies for different types of ware.

My apparatus and method lend themselves particularly to economical production of ware by those factories which cater to the prescription and similar trades whereon orders are for relatively small numbers of different styles of bottles. It is apparent that with the provision of the two neck rings for the settle-blow mold, the units shown in the drawings may readily be used with a single feeder to produce simultaneously bottles having two different neck finishes and, if desired, four different body contours. The limitation upon this use of my apparatus and method is that these bottles be all of the same weight and be sufficiently alike in shape that they may be made from similar parisons.

The organized machine shown and described herein as a preferred embodiment of this invention is only one of many possible embodiments of the invention. It should be understood that the various features of the invention may be modified, both in structure, combination and arrangement to adapt the invention to different uses or different conditions of service without departing from the spirit and scope of the invention, as indicated by the appended claims.

I claim:

1. The method of shaping hollow glassware which comprises shaping a blank in a blank mold, transferring the blank to one of a plurality of counter-blow molds, counter-blowing the blank in said counter-blow mold to form a parison and simultaneously forming another blank in said blank mold, transferring the second mentioned blank to another of said counter-blow molds, counterblowing said second mentioned blank in said counter-blow mold to form a second parison and simultaneously forming a third blank in said blank mold, transferring the first mentioned parison to one of a plurality of blow molds, transferring the third blank to the first mentioned counter-blow mold, forming a fourth blank in said blank mold, transferring the second mentioned parison to another of said plurality of blow molds and simultaneously transferring the fourth mentioned blank to the second mentioned counter-blow mold, blowing the first mentioned parison to final form in said blow mold, and simultaneously counterblowing the third mentioned blank to form a third parison in the first mentioned counterblow mold.

2. The method of shaping hollow glassware which comprises settling a mold charge in a blank mold to form the neck finish thereof, transferring the blank to a counter-blow mold, counter-blowing the blank therein and simultanenously settling a succeeding blank in said blank mold, transferring the counter-blown blank to a finish blow mold, applying blowing pressure to said counterblown blank and simultaneously counter-blowing the succeeding blank in said counter-blow mold and settling a still succeeding mold charge in said blank mold, said finish blowing pressure being applied for a period of time exceeding in duration the settling of the mold charge in said blank mold.

3. The method of shaping hollow glassware which comprises settling a mold charge in a blank mold to form the neck finish thereof, transferring the blank thus formed to a counter-blow mold, counterblowing the blank therein and simultaneously settling a succeeding blank in said blank mold, transferring the counterblown blank to a finish blow mold, applying blowing pressure to said blank and simultaneously counterblowing the succeeding blank in said counter-blow mold and settling the still succeeding mold charge in said blank mold, said finish blowing pressure being applied for a period of time exceeding in duration the time of counterblowing the blank in said counter-blow mold.

4. The method of shaping hollow glassware which comprises compacting a mold charge in a blank mold, transferring the blank thus formed to a counter-blow mold, counterblowing the blank in said counter-blow mold and simultaneously compacting another mold charge in said blank mold, transferring the counterblown blank to a blow mold, transferring the second mentioned blank to said counter-blow mold, counterblowing said second mentioned blank in said counter-blow mold, transferring said second mentioned blank to another blow mold, blowing said second mentioned blank to final form in said second mentioned blow mold, and blowing said first mentioned blank to final form in said first mentioned blow mold for a period of time overlapping at least in part the counterblowing, transferring and finish blowing of the second mentioned blank.

5. The method of shaping hollow glassware which comprises compacting a mold charge in a blank mold to form a blank, transferring the blank to a counter-blow mold, compacting a second mold charge in said blank mold to form a second blank, transferring said second blank to another counter-blow mold, compacting a third mold charge in said blank mold to form a third blank, counterblowing the first mentioned blank in said first mentioned counter-blow mold simultaneously with the compacting of the second and third mentioned blanks in said blank mold and the transfer of the second mentioned blank to the second mentioned counter-blow mold, counterblowing the second mentioned blank in said second mentioned counter-blow mold, transferring the first mentioned blank to a blow mold and simultaneously transferring the third mentioned blank to the first mentioned counter-blow mold, compacting a fourth mold charge in said blank mold to form a fourth blank, transferring the fourth mentioned blank to the second mentioned counter-blow mold, compacting a fifth mold charge in said blank mold to form a fifth blank, transferring said fifth blank to said first mentioned counter-blow mold, compacting a sixth mold charge in said blank mold to form a sixth blank, transferring said sixth blank to said second mentioned counter-blow mold, compacting a seventh mold charge in said blank mold to form a seventh blank, and blowing the first mentioned blank to final form in said first mentioned blow mold throughout the formation of a plurality of the succeeding blanks in said blank mold and the counterblowing thereof in said counter-blow molds.

6. Apparatus for shaping hollow glassware comprising a blank mold, a counter-blow mold associated therewith, said blow mold associated with said counter-blow mold, means for simultaneously forming a blank in said blank mold and counterblowing a blank previously formed in said blank mold in said counter-blow mold, and means for blowing a blank previously counterblown in said counter-blow mold to final form in said blow mold throughout the formation of the first mentioned blank in said blank mold and a counterblowing thereof in said counter-blow mold.

7. Apparatus for shaping hollow glassware comprising a blank mold, a counter-blow mold associated therewith, means for forming blanks in said blank mold, means for transferring blanks thus formed to said counter-blow mold, means for counterblowing said blanks in said counter-blow mold, a plurality of blow molds associated with said counter-blow mold, means for alternately transferring blanks from said counter-blow mold to said blow molds, and means for blowing a blank to final form in one of said blow molds during the transfer of a succeeding blank from said counter-blow mold to another of said blow molds.

8. Apparatus for shaping hollow glassware comprising a blank mold, a plurality of counter-blow molds associated therewith, a plurality of neck rings alternately cooperating with said blank mold and said counter-blow molds, means for compacting mold charges in said blank mold and neck rings to form blanks, means for actuating said neck rings to transfer said blanks from said blank mold to said counter-blow mold, and means for counterblowing a mold charges in one of said counter-blow molds simultaneously with the compacting of a succeeding mold charge in said blank mold and one of said neck rings, the transfer thereof to another of said counter-blow molds, and the counterblowing thereof in said counter-blow molds.

9. In an apparatus for shaping hollow glassware, a blank mold permanently disposed at a fixed blank forming station, means for forming blanks in said blank mold, a plurality of counter-blow molds associated with said blank mold and permanently disposed at a plurality of fixed counterblowing stations, means for transferring blanks from said blank forming station to said counterblowing stations and for supporting the blanks at said stations with a major portion thereof out of contact with said counter-blow molds to permit said blanks to reheat, and means for counterblowing a blank in one of said counter-blow molds during the time that a succeeding blank is being transferred to another of said counterblowing stations and while it is supported out of contact with the counter-blow mold located at said station.

10. Apparatus for shaping hollow glassware comprising a blank mold, means for forming blanks in said blank mold, a plurality of counter-blow molds associated with said blank mold, means for transferring blanks from said blank mold to said counter-blow molds, means for counterblowing the blanks in said counter-blow molds to form parisons, a plurality of finish blow molds associated with each of said counter-blow molds, means for transferring the parisons from said counter-blow molds to said finish blow molds, and means for blowing a parison into an article of ware in one of said finish blow molds throughout the duration of the formation of blanks in said blank mold for each of said counter-blow molds and during the counterblowing of said blanks in said counter-blow molds.

11. Apparatus for shaping hollow glassware comprising a blank mold, a plurality of counter-blow molds associated therewith, a plurality of finish blow molds associated with each of said counter-blow molds, means for shaping blanks in said blank mold, means for alternately transferring the blanks thus formed to said counter-blow molds, means for counterblowing said blanks in said counter-blow molds to form parisons, means for transferring the parisons thus formed to said finish blow molds, and means for blowing the parisons into an article of ware in said finish blow molds, each of said finish blowing operations continuing during the time that the next succeeding parison is being blown in the same counter-blow mold for transfer to another blow mold associated with said counter-blow mold, the time that a third parison is being formed in said counter-blow mold for transfer to the first mentioned blow mold, and the time that three blanks are being formed in said blank mold for transfer to the counter-blow molds.

12. Apparatus for shaping hollow glassware comprising a blank mold, a plurality of counterblow molds associated therewith, a plurality of finish blow molds associated with each of said counter-blow molds, means for shaping blanks in said blank mold, means for alternately transferring the blanks thus formed to said counter-blow molds, means for counterblowing said blanks in said counter-blow molds to form parisons, means for transferring the parisons thus formed to said finish blow molds, and means for blowing the parisons to final form in said finish blow molds, each of said finish blowing operations continuing throughout the time that the next succeeding parison is being blown in the same counter-blow mold for transfer to another of the blow molds associated with said same counter-blow mold, the time that the third parison is being formed in said same counter-blow mold for transfer to the first mentioned blow mold, and the time that blanks are being formed in said blank mold for transfer respectively to said same counter-blow mold, another counter-blow mold and again to said same counter-blow mold, each of said finish blowing operations continuing for a period of time as great as twice that of a formation of a parison in said counter-blow molds and four times that of the formation of a blank in said blank mold.

13. Apparatus for shaping hollow glassware comprising a blank mold, means for forming blanks in said blank mold, a plurality of counter-blow molds associated with said blank mold, means for transferring blanks from said blank mold to said counter-blow molds, means for counterblowing the blanks in said counter-blow molds to form parisons, a plurality of finish blow molds associated with each of said counter-blow molds, means for transferring the parisons from said counter-blow molds to said finish blow molds, and means for blowing a parison to final form in each of said finish blow molds.

14. Apparatus for shaping hollow glassware comprising a blank mold, means for forming blanks therein, a counter-blow mold associated with said blank mold, means for transferring blanks formed in said blank mold to said counter-blow mold, means for counterblowing blanks in said counter-blow mold to form parisons, a finish blow mold associated with said counter-blow mold, means for transferring the parisons formed in said counter-blow mold to said finish blow mold, and means for blowing the parisons to final form in said finish blow mold during at least a portion of the time that a succeeding blank is being formed in said blank mold and a portion of the time said blank is being counterblown in said counter-blow mold.

15. Apparatus for shaping hollow glassware comprising a blank mold, means for forming blanks therein, a counter-blow mold associated with said blank mold, means for transferring blanks formed in said blank mold to said counter-blow mold, means for counterblowing blanks in said counter-blow mold to form parisons, a finish blow mold associated with said counter-blow mold, means for transferring the parisons formed in said counter-blow mold to said finish blow mold, and means for blowing the parisons to final form in said finish blow mold simultaneously with the formation of a succeeding blank in said blank mold and a parison from said blank in said counter-blow mold, and another blank in said blank mold.

16. Apparatus for shaping hollow glassware comprising a blank mold, means for forming a blank therein, a plurality of counter-blow molds associated with said blank mold, means for alternately transferring blanks formed in said blank mold to said counter-blow molds, means for counterblowing the blanks in said counter-blow molds to form parisons, a blow mold associated with each of said counter-blow molds, means for transferring the parisons from said counter-blow molds to said blow molds, and means for blowing the parisons to final form in one of said finish blow molds simultaneously with the counterblowing of a parison in its associated counter-blow mold and with the formation of a blank in said blank mold for transfer to another counter-blow mold.

17. Apparatus for shaping hollow glassware, comprising a blank mold, means for forming blanks in said blank mold, a counter-blow mold associated with said blank mold, means for transferring blanks from said blank mold to said counter-blow mold, means for counterblowing the blanks in said counter-blow mold to form parisons, a plurality of blow molds associated with said counter-blow mold, and means for blowing a parison formed to blank form in said blank mold to final form in a blow mold simultaneously with the formation of a succeeding blank in said blank mold and the counterblowing thereof to form a parison in said counter-blow mold.

18. Apparatus for shaping hollow glassware comprising a blank mold permanently disposed at a fixed blank forming station, a counter-blow mold associated with said blank mold and permanently disposed at a fixed counter-blow station, a plurality of final blow molds associated with said counter-blow mold and permanently disposed at fixed final blowing stations, means for forming blanks in said blank mold, means for transferring said blanks from the blank mold to the counter-blow mold, means for counterblowing said blanks in the counter-blow molds, means for transferring the counterblown blanks from the counter-blow mold to the final blow molds, and means for blowing the counterblown blanks to final form in the final blow molds.

19. Apparatus for shaping hollow glassware, comprising a blank mold, means for successively settle blowing at least four charges of glass in said blank mold to form blanks, a plurality of counter-blow molds, means for transferring the first and third of said blanks to one of said counter-blow molds, means for transferring the second and fourth of said blanks to another of said counter-blow molds, means associated with the first counter-blow mold for counterblowing the first blank to form a parison, the second blank being settle blown in said blank mold simultaneously with the counterblowing of the first blank, means associated with the second-mentioned counter-blow mold for counterblowing the second blank to form a second parison, the third blank being settle blown in said blank mold simultaneously with the counter-blowing of said second blank, a plurality of final blow molds, means for transferring the first-mentioned parison to one of said blow molds, means for blowing said first parison to final form, the fourth blank being settle blown in said blank mold simultaneously with the blowing of said first parison to final form, and said counterblowing means associated with the first counter-blow mold being actuated to counter-blow the third blank also simultaneously therewith, and means for transferring the second parison from the second-mentioned counter-blow mold to another of said plurality of blow molds.

20. Apparatus for shaping hollow glassware, comprising a blank mold, means for successively settle blowing at least seven charges of glass in said blank mold to form blanks, a pair of counter-blow molds associated with said blank mold and adapted to receive blanks alternately therefrom, means for transferring the first, third, fifth and seventh blanks of the said seven to one of said counter-blow molds, means for transferring the second, fourth and sixth blanks of the seven to the other of the counter-blow molds, means for counter-blowing the first blank to form a parison in the first counter-blow mold simultaneously with the settle blowing of the second and third blanks in said blank mold and the transfer of the second blank to said other counter-blow mold, means for counter-blowing the second blank in said other counter-blow mold, a blow mold, means for transferring the parison formed from the first blank from the first counter-blow mold to said blow mold simultaneously with the transfer of the third blank from said blank mold to said first counter-blow mold, and means for blowing the parison formed from the first blank to final form throughout the formation of a plurality of the succeeding blanks in said blank mold and the counter-blowing thereof in said counter-blow molds.

21. Apparatus for forming hollow glassware which comprises means, including a blank mold having a single mold cavity, for forming blanks from charges of glass, a counterblow mold, means for counter-blowing the blanks in said counterblow mold to form parisons, a finish blow mold, means for transferring the blanks to the counterblow mold and the parisons from the counterblow mold to the finish blow mold, and means for blowing a parison to final form in said finish blow mold while more than one blank is being formed by said blank forming means.

22. Apparatus for forming hollow glassware which comprises means for forming blanks from charges of glass, a counterblow mold, means for counterblowing the blanks in said counterblow mold to form parisons, a finish blow mold, means for transferring the blanks to said counterblow mold and the parisons from the counterblow mold to the finish blow mold, and means for blowing a parison to final form in said final blow mold while more than one parison is being formed in said counterblow mold.

23. Apparatus for shaping hollow glassware, comprising means including at least one blank mold for forming blanks from charges of molten glass, a counterblow mold associated therewith, means for transferring the blanks to said counterblow mold, means for counterblowing said blanks in said counterblow mold to form parisons, a plurality of finish blow molds associated with said counterblow mold, means for successively transferring parisons from said counterblow mold to said finish blow molds, and means for blowing a parison to final form in one of said finish blow molds during the transfer of a succeeding parison from said counterblow mold to another of said finish blow molds.

24. Apparatus for shaping hollow glassware, comprising means including at least one blank mold for forming blanks from charges of molten glass, a counterblow mold associated therewith, means for transferring blanks to said counterblow mold, means for counterblowing said blanks in said counterblow mold to form parisons, a plurality of final blow molds associated with said counterblow mold, means for successively transferring parisons from said counterblow mold to said final blow molds, and means for blowing a blank to final form in one of said final blow molds during the blowing to final form of another blank in another of said final blow molds.

25. Apparatus for shaping hollow glassware comprising means for forming a blank including blank mold sections, a plurality of counterblow molds associated with said means, a plurality of finish blow molds associated with one of said counterblow molds, means for successively transferring formed blanks to said counterblow molds, means for counterblowing said blanks in said counterblow molds to form parisons, means for transferring the parisons thus formed to said finish blow molds, and means for blowing the parisons to final form in said finish blow molds, each of said finish blowing operations continuing throughout the time that a succeeding parison is being held in another finish blow mold, the time that a third parison is being formed in said counterblow mold for transfer to the first-mentioned blow mold, and the time that blanks are being formed for transfer to one of said counterblow molds, to another of said counterblow molds and still another for the first-mentioned counterblow mold.

26. A glass blowing machine, comprising a blank forming means including at least one blank mold, a counterblow mold adapted to receive partially formed blanks of viscous glass formed by said blank forming means, a plurality of final blow molds, means for supporting the blanks for moving them toward and positioning them within said counterblow mold, means for counterblowing the blanks to parisons in succession within said counterblow mold, means for transferring the parisons successively to different final blow molds, and means for blowing the parisons to final form therein.

27. Apparatus for shaping hollow glassware comprising means for forming blanks, a plurality of counterblow molds associated with said blank forming means, a plurality of finish blow molds associated with said counterblow molds, means for successively transferring formed blanks to said counterblow molds, means for counterblowing said blanks in said counterblow molds to form parisons, means for successively transferring the parisons thus formed to said finish blow molds, and means for blowing the parisons to final form in said finish blow molds.

28. Apparatus for shaping hollow glassware comprising means for forming blanks including blank body mold sections, a counterblow mold associated therewith, means for transferring the blanks to said counterblow mold, means for counterblowing said blanks in said counterblow mold, a plurality of blow molds associated with said counterblow mold, means for successively transferring blanks from said counterblow mold to said blow molds, and means for blowing blanks to final form in said blow molds.

29. The method of forming hollow glassware which comprises forming a blank in a blank mold, counterblowing said blank in a counterblow mold to form a parison, transferring said parison to a final blow mold and blowing said parison to final form in said blow mold during at least a portion of the time that a succeeding blank is being formed in said blank mold and a portion of the time that said succeeding blank is being counterblown in said counterblow mold.

30. The method of forming hollow glassware which comprises supplying successive charges of glass to a blank mold, forming successive blanks therein, removing the blanks successively from said blank mold and maintaining a major portion of each out of contact with any surface to reheat their outer surfaces, successively counterblowing the blanks to form parisons against mold surfaces other than those against which the blanks have been formed, successively blowing the parisons so formed to final form against mold surfaces other than the above-named mold surfaces, the formation of the second blank occurring simultaneously with at least a portion of the reheating of the first blank, and the formation of the third blank and the reheating of the second blank taking place during a period during which the first parison is being counterblown.

31. The method of shaping hollow glassware which comprises shaping a blank in a blank mold, transferring the blank to one of a plurality of counterblow molds, counterblowing the blank in the counterblow mold to form a parison, forming another blank in said blank mold, transferring the second-mentioned blank to another of said counterblow molds, counterblowing the second-mentioned blank in said counterblow mold to form a second parison, forming a third blank in said blank mold, transferring the first-mentioned parison to one of a plurality of blow molds, transferring the third blank to the first-mentioned counterblow mold, forming a fourth blank in said blank mold, blowing the first-mentioned parison to final form in said blow mold and simultaneously counterblowing the third-mentioned blank to form a third parison in the first-mentioned counterblow mold, transferring the second-mentioned parison to another of said plurality of blow molds, and transferring the fourth-mentioned blank to the second-mentioned counterblow mold.

32. The method of shaping hollow glassware which comprises forming a plurality of blanks in a single blank mold, transferring said blanks successively to two counterblow molds, counterblowing the blanks in said counterblow molds to form parisons, transferring the parisons from said counterblow molds successively in the order in which they were delivered to said counterblow molds to a plurality of final blow molds, and blowing said parisons to final form in said final blow molds.

33. The method of shaping hollow glassware which comprises forming a plurality of blanks from a plurality of mold charges of molten glass, transferring said blanks successively to a counterblow mold, counterblowing blanks in said counterblow mold to form parisons, transferring the parisons from said counterblow mold successively in the order in which they were delivered to said counterblow mold to a plurality of final blow molds, and blowing said parisons to final form in said final blow molds.

Signed at Hartford, Connecticut this 30th day of March 1928.

HENRY W. INGLE.